Feb. 4, 1969  W. E. SMITH  3,425,443
AIR CONDITIONING
Filed Sept. 23, 1965
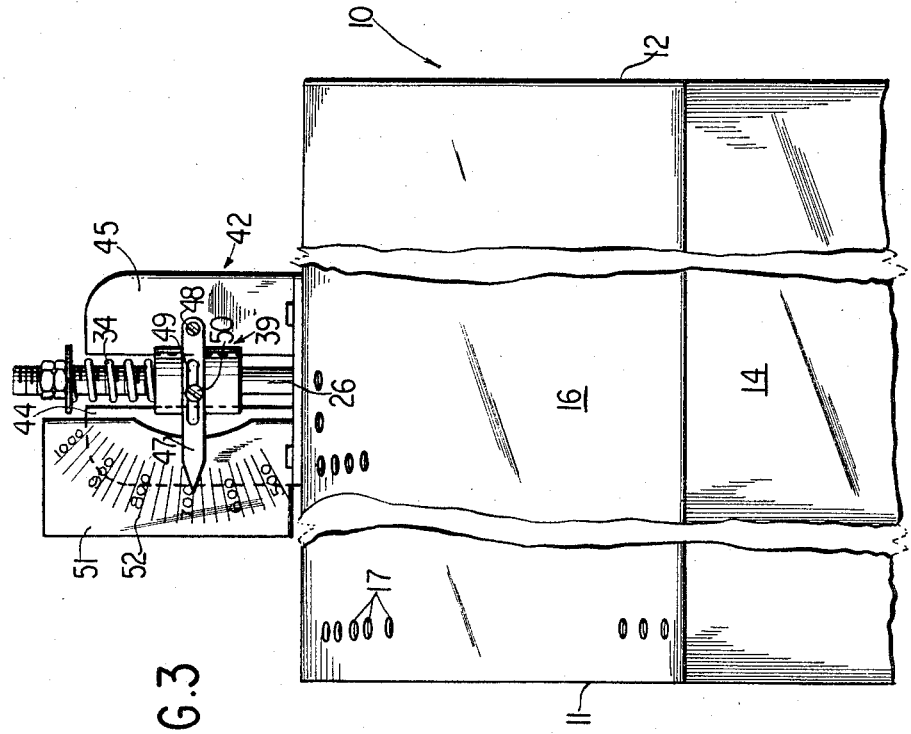
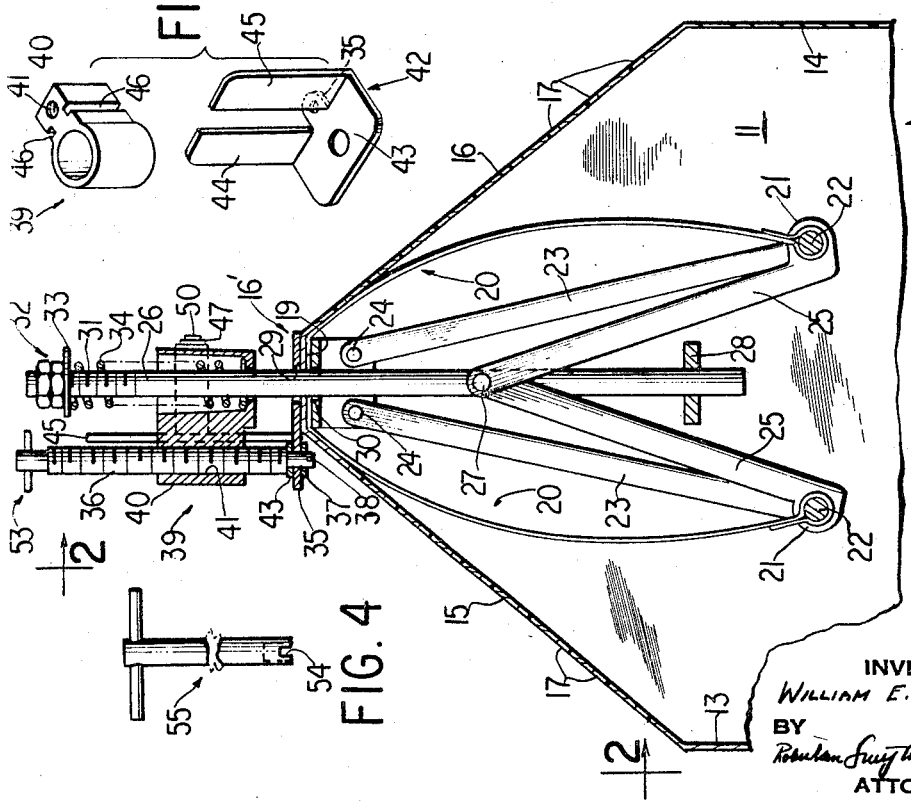
INVENTOR
WILLIAM E. SMITH
BY
ATTORNEYS United States Patent Office 3,425,443
Patented Feb. 4, 1969

3,425,443
AIR CONDITIONING
William E. Smith, Charlotte, N.C., assignor to Buensod-Stacey Corporation, New York, N.Y., a corporation of Ohio
Filed Sept. 23, 1965, Ser. No. 489,665
U.S. Cl. 137—512.15        7 Claims
Int. Cl. G05d 7/01; F24f 13/08; F16k 13/00

ABSTRACT OF THE DISCLOSURE

Air conditioning system device for controlling air therethrough in conjunction with a calibrated arrangement for presetting the volume of air passable through the device.

---

This invention relates to fluid flow control devices and particularly to an arrangement for maintaining constant a predetermined volume of air flowing through a passage or duct such as the air delivery ducts from central air conditioning systems.

In air conditioning systems where air is supplied from a central conditioning device to a plurality of individual distributing units, changing demands in the rooms or zones to be conditioned will cause pressure variations in the air delivery lines with resultant variations in volume flowing therethrough.

As an example, where dual duct systems are involved, particularly those operating at relatively high pressure such as described in Patent No. 2,708,568, flow in the warm and cold air ducts may vary over wide ranges in response to demands, and such may result in wide variations in pressure in the ducts. Variations in pressure will cause objectionable changes in air distribution, noises, and other undesirable effects, unless the flow is controlled.

Prior known control devices for overcoming the above as well as other difficulties are shown, described and claimed in U.S. Patent No. 2,890,716, granted to Wedrer on July 16, 1959. In the Wedrer device, the flow control means comprises a housing having sloping, perforated walls through which the air is adapted to pass into a mixing chamber from which it exits to the room or zone to be conditioned.

Flexible curtain means is provided within the housing and is urged through linkage in a direction tending to remove the curtain means from the surfaces of the perforated wall means. Spring means is employed to normally maintain the linkage in the position described, and adjustable nut means varies the force of the spring, thereby to control the amount of air flowing through the control device. Devices such as the Werder device require adjustment in order to cause the device to pass a predetermined quantity of air.

The principal object of the present invention is to produce a flow regulator for air conditioning systems in which the regulator may be conveniently preset to pass a predetermined volume of air and which regulator will function to vary the opening through the regulator in response to fluctuations in pressure or velocity of upstream incoming supply air.

Another object of the invention is to provide a flow regulator of the type including flexible curtain means adapted to be moved against and away from a perforated wall to control the warm air passing through the regulator, and to calibrated means for presetting the flexible curtain means for a predetermined quantity of air flowing through the regulator.

Still another object of the invention is to provide such a regulator in which the spring means normally urging the curtain means away from the perforated walls of the regulator can be compressed or expanded by means that cooperates with an index indicating the volume of air going through the regulator at any given compression of the spring means.

In one aspect of the invention, a flow regulator may comprise a housing having impervious end walls that are joined by inclined, perforated side walls, the latter being joined together at the crown of the housing. Flexible curtain means may be mounted inside of the housing at the crown thereof such that there is provided a flexible curtain means for each of the perforated side walls, and which curtain means are adapted to be rolled onto the inner surface of said side walls to vary the number of perforations there in through which air passes in the normal operation of the regulator.

In another aspect of the invention, the free ends of the curtain means may be joined to linkage means having certain links anchored at the crown of the housing and certain other links pivotally connected to a reciprocable rod that extends through the crown of the housing and contains an adjusting nut means threaded to the upper end thereof. Spring means may be provided between the adjustable nut means and a cup-shaped member adapted to be reciprocated along the rod means to vary the effectiveness of the spring means. The spring means normally urges the rod means in a direction collapsing the linkage and thereby withdrawing the curtain means from the perforated wall means.

In a further aspect of the invention, a support may extend outwardly from the crown means of the housing and it may journal a threaded rod parallel with the rod connected to the linkage for the flexible curtain means.

In a still further aspect of the invention, the cup-shaped member that supports one end of the spring may be threaded onto the threaded rod, and the construction is such that upon rotation of the threaded rod, the cup-shaped member is caused to reciprocate along the rod means connected to the linkage means. In this way, the force or effectiveness of the spring means in urging the rod means in a direction to collapse the linkage means can be varied.

In another aspect of the invention, an indicating pointer may be connected to the cup-shaped member, and a scale including indicia may be mounted in position for said indicating pointer to pass thereover, the indicia being calibrated in accordance with the particular spring means employed to indicate the volume of air in cubic feet per minute that passes through the regulator for a given setting of the cup member and therefore a given compression of the spring means.

In a further aspect of the invention, key means may be provided for turning the threaded rod means from a remote point to facilitate the adjustment of said spring means.

The above, other objects and novel features of the invention will become apparent from the following specification and accompanying drawing which are merely exemplary.

In the drawing:
FIG. 1 is a sectional elevational view of an air flow regulator to which the principles of the invention have been applied;
FIG. 2 is a view looking in the direction of the arrows along line 2—2 of FIG. 1;
FIG. 3 is a perspective view of a detail of the invention; and
FIG. 4 is a view of the key employed to operate the structure of the invention.

Referring to the drawing, the principles of the invention are shown as applied to a flow regulator comprising a housing 10 including spaced end walls 11 and 12 that are impervious. Side walls 13 and 14 may extend from the lower end of the housing 10 upwardly a short distance. Inclined side walls 15 and 16 may extend from the top edge of the side walls 13 and 14 upwardly to a crown 16' where they terminate. The walls 15 and 16 may be provided with perforations 17 for the passage of air entering the lower end of the housing 10.

Bracket means 18 may be attached to the inside of housing 10 at the crown 16' and secures the one end 19 of curtain means 20 to the crown. There may be an identical curtain means on each side of the bracket 18, one for each of the perforated walls 15 and 16.

The free, or lower ends 21 of curtain means 20 may be fixed to parallel rod means 22. Rod means 22 may be connected to links 23 that are pivotally connected to the bracket 18 by pins 24. Other links 25 may have their one ends connected to the rods 22 and their opposite ends pivotally connected to a vertically reciprocable rod 26 by a pin 27. The vertically reciprocable rod 26 may be guided at its lower end by a strip 28 extending between the walls 11 and 12, and it may extend upwardly through an opening 29 in the crown of housing 10, as well as through an opening 30 in the bracket 18.

The end of rod 26 that extends upwardly through the crown of housing 10 may be threaded at 31, and a locking nut arrangement 32 may be screwed thereon, which acts with a washer 33 as an abutment for spring means 34.

The crown 16' of housing 10 may include a bracket 35 extending outwardly therefrom, and in which the one end of a threaded rod 36 is journaled and held against axial movement by washers 37 and a pin 38. A cup member 39 may receive the lower end of the spring 34 and it may include a boss 40 that is provided with a threaded opening 41 for receiving the threaded rod 36. The construction is such that upon rotation of the rod 36, the cup-shaped member 39 is caused to reciprocate along the threaded rod 36 to thereby vary the degree of compression of the spring 34 between the bottom of the cup member 39 and the washer 33 at the upper end of the rod 26.

Referring to FIGS. 1 and 3, a bracket 42 includes a plate 43 through which the bottom of the threaded rod 36 extends. It also includes spaced, vertical guide elements 44 and 45, the facing edges of which receive grooves 46 on each side of the boss 40 so as to prevent turning of the cup-shaped member 39 when the threaded rod 36 is turned.

Referring to FIG. 2, a pointer 47 is pivoted to the guide element 45 by a pin 48. The pointer 47 may include an elongated slot 49 through which a screw 50 extends which is threaded into the cup-shaped member 39. A plate 51 is mounted on the bracket 35 and it includes a scale 52 that corresponds to the spring 34, and indicates the cubic feet per minute that pass through the housing 10 for a given setting of the cup-shaped member 39.

Referring to FIGS. 1 and 4, the upper end of the threaded rod 36 includes a pin means 53 adapted to cooperate with slotted means 54 of a key 55. Key 55 when applied to the top of the threaded rod 36 can facilitate the rotation thereof to vary the vertical position of the cup member 39 thereby to vary the effectiveness of the spring 34 in its action tending to collapse the linkage 23, 25 to thereby peel off the curtain means 20 from the inside of the perforated walls 15 and 16.

From the foregoing it is evident that by turning the threaded rod 36, a predetermined volume of air may be passed through the housing 10 and that such volume will be maintained in spite of fluctuations upstream of the supply air to the regulator.

Although the various features of the improved regulator and calibrated presetting means have been shown and described in detail to fully disclose one embodiment of the invention, it will be evident that changes may be made in such details, and certain features may be used without others without departing from the principles of the invention.

What is claimed is:

1. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; abutment means acting on the other end of said spring means; means for moving said abutment means to vary the effectiveness of said spring means; and an indicating scale means fixedly mounted relative to said plate means; and a pointer means pivotally mounted relative to said adjusting means and said abutment moving means and calibrated relative to said spring means for indicating the flow of air through said regulator for a given setting of said indicator means.

2. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a cup-shaped member for receiving the opposite end of said spring; means for moving said cup-shaped member to vary the effectiveness of said spring means; a pointer connected to said cup-shaped member; and an indicating scale, calibrated relative to said spring means, over which said pointer moves.

3. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a threaded rod mounted parallel to said reciprocable rod and fixed against axial movement; means threaded on said threaded rod and engaging the other end of said spring means; and means for turning said threaded rod to vary the effectiveness of said spring means.

4. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a threaded rod mounted parallel to said reciprocable rod and fixed against axial movement; means threaded on said threaded rod and engaging the other end of said spring means; means for turning said threaded rod to vary the effectiveness of said spring means; a pointer connected to the means threaded onto said threaded rod; and an indicating scale, calibrated relative to said spring means, over which said pointer moves.

5. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a threaded rod mounted parallel to said reciprocable rod and fixed against axial movement; means threaded on said threaded rod and engaging the other end of said spring means; means for turning said threaded rod to vary the effectiveness of said spring means; and means for preventing the turning of said means that is threaded thereon when said threaded rod is turned.

6. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a threaded rod mounted parallel to said reciprocable rod and fixed against axial movement; a cup-shaped member for receiving the opposite end of said spring means and including means threaded onto said threaded rod; and means for turning said threaded rod to vary the effectiveness of said spring means.

7. In a volume regulator for air conditioning systems, the combination comprising perforated plate means through which air is adapted to pass; flexible curtain means adapted to roll on and peel off said perforated plate means to vary the volume of air passing through said regulator; a reciprocable rod; linkage connecting said reciprocable rod to said curtain means; spring means having one end acting on said reciprocable rod for urging said curtain means away from said plate means; a threaded rod mounted parallel to said reciprocable rod and fixed against axial movement; a cup-shaped member for receiving the opposite end of said spring means and including means threaded onto said threaded rod; means for turning said threaded rod to vary the effectiveness of said spring means; a pointer connected to said cup member; and an indicating scale, calibrated relative to said spring means, over which said pointer moves.

References Cited

UNITED STATES PATENTS

| | | | |
|---|---|---|---|
| 2,349,719 | 5/1944 | Guthrie | 137—514 |
| 2,890,716 | 6/1959 | Werder | 137—512.15 |
| 3,053,275 | 9/1962 | Waterfill | 137—512.1 |
| 3,060,960 | 10/1962 | Waterfill | 137—512.1 |
| 3,191,615 | 6/1965 | Edwards | 137—514 |
| 3,242,943 | 3/1966 | Waterfill | 137—512.1 |
| 3,292,657 | 12/1966 | Reynolds | 137—512.15 |
| 1,284,154 | 11/1918 | Scott | 137—556 |

WILLIAM F. O'DEA, *Primary Examiner.*

WM. H. WRIGHT, *Assistant Examiner.*

U.S. Cl. X.R.

137—514, 514.5; 267—1